United States Patent
Brown et al.

(10) Patent No.: US 11,719,086 B2
(45) Date of Patent: Aug. 8, 2023

(54) REVERSE FLOW GAS SEPARATOR

(71) Applicant: Halliburton Energy Services, Inc., Houston, TX (US)

(72) Inventors: Donn J. Brown, Tulsa, OK (US); Trevor Alan Kopecky, Tulsa, OK (US); Casey L. Newport, Tulsa, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 95 days.

(21) Appl. No.: 17/006,121

(22) Filed: Aug. 28, 2020

(65) Prior Publication Data
US 2022/0065091 A1 Mar. 3, 2022

(51) Int. Cl.
| | |
|---|---|
| E21B 43/38 | (2006.01) |
| E21B 43/40 | (2006.01) |
| B01D 19/00 | (2006.01) |
| F04D 7/04 | (2006.01) |
| E21B 43/12 | (2006.01) |

(52) U.S. Cl.
CPC .......... *E21B 43/38* (2013.01); *B01D 19/0052* (2013.01); *E21B 43/121* (2013.01)

(58) Field of Classification Search
None
See application file for complete search history.

(56) References Cited

U.S. PATENT DOCUMENTS

| | | | | |
|---|---|---|---|---|
| 2,311,963 A | * | 2/1943 | Pyle | F04D 13/10 96/194 |
| 3,204,696 A | * | 9/1965 | De Priester | E21B 36/02 55/456 |
| 4,900,433 A | | 2/1990 | Dean et al. | |
| 5,482,117 A | * | 1/1996 | Kolpak | E21B 43/38 166/265 |
| 5,902,378 A | * | 5/1999 | Obrejanu | B01D 19/0052 96/204 |
| 6,035,934 A | * | 3/2000 | Stevenson | E21B 4/02 166/265 |
| 6,039,116 A | * | 3/2000 | Stevenson | E21B 43/385 166/263 |
| 6,283,204 B1 | * | 9/2001 | Brady | E21B 43/35 166/265 |
| 6,761,215 B2 | * | 7/2004 | Morrison | E21B 43/38 96/217 |
| 8,361,208 B2 | * | 1/2013 | Hill | B21C 37/15 96/216 |
| 8,931,564 B2 | * | 1/2015 | Anter | E21B 43/126 417/244 |

(Continued)

OTHER PUBLICATIONS

Office Action in CA Application No. 3, 120,513, dated Feb. 17, 2023.

*Primary Examiner* — Matthew Troutman
*Assistant Examiner* — Douglas S Wood
(74) *Attorney, Agent, or Firm* — Barnes & Thornburg LLP

(57) ABSTRACT

A reverse flow gas separator having a housing having a housing intake and a first void space within the housing. The reverse flow gas separator further includes a driveshaft disposed adjacent to the first void space. The drive shaft is hollow and comprises a second void space disposed within the interior of the drive shaft. The second void space is continuous from a driveshaft intake to an opening in a terminal end of the driveshaft.

20 Claims, 4 Drawing Sheets

(56) References Cited

U.S. PATENT DOCUMENTS

| | | | |
|---|---|---|---|
| 10,408,035 B2 | 9/2019 | Kennedy et al. | |
| 11,143,009 B1* | 10/2021 | Novak | E21B 43/128 |
| 2002/0178924 A1* | 12/2002 | Brown | B01D 19/0052 |
| | | | 96/214 |
| 2009/0065202 A1* | 3/2009 | Brown | E21B 43/128 |
| | | | 166/267 |
| 2013/0284423 A1* | 10/2013 | Morrison | E21B 43/38 |
| | | | 166/105.5 |
| 2019/0162063 A1* | 5/2019 | Brown | F04D 9/003 |

\* cited by examiner

REVERSE FLOW GAS SEPARATOR

TECHNICAL FIELD

The present disclosure relates generally to production operations, and more particularly, to the use of a reverse flow gas separator to prevent a gas or gas slug from reaching a pump intake and to also provide a reservoir of fluid so that the pump may still operate when high concentrations of gas or a gas slug is present.

BACKGROUND

Producing wells may make use of pumps to lift a production fluid up the production tubing. During production, gas may travel with the liquid components of the production fluid as bubbles dispersed therein, or the gas may travel through the wellbore as a gas slug. A gas slug is a large volume of gas with little or no liquid. For example, deviated or horizontal wells may have gas pockets form in high spots or rises in the casing. These gas pockets may be flushed by pressure or liquid traveling downstream and they may be forced into upstream pumps. When a gas enters the pump it can impede the performance of the pump which may be detrimental to wellbore operations.

Separation of the gas from the liquid components of the fluid and/or mitigation of a gas slug from impeding performance are both important considerations when operating a pump in the wellbore. Provided are improvements to wellbore operations, through the use of a reverse flow gas separator to prevent a gas or gas slug from reaching a pump intake and to also provide a reservoir of fluid so that the pump may still operate when high concentrations of gas or a gas slug is present.

BRIEF DESCRIPTION OF THE DRAWINGS

Illustrative examples of the present disclosure are described in detail below with reference to the attached drawing figures, which are incorporated by reference herein, and wherein.

Figure 1:
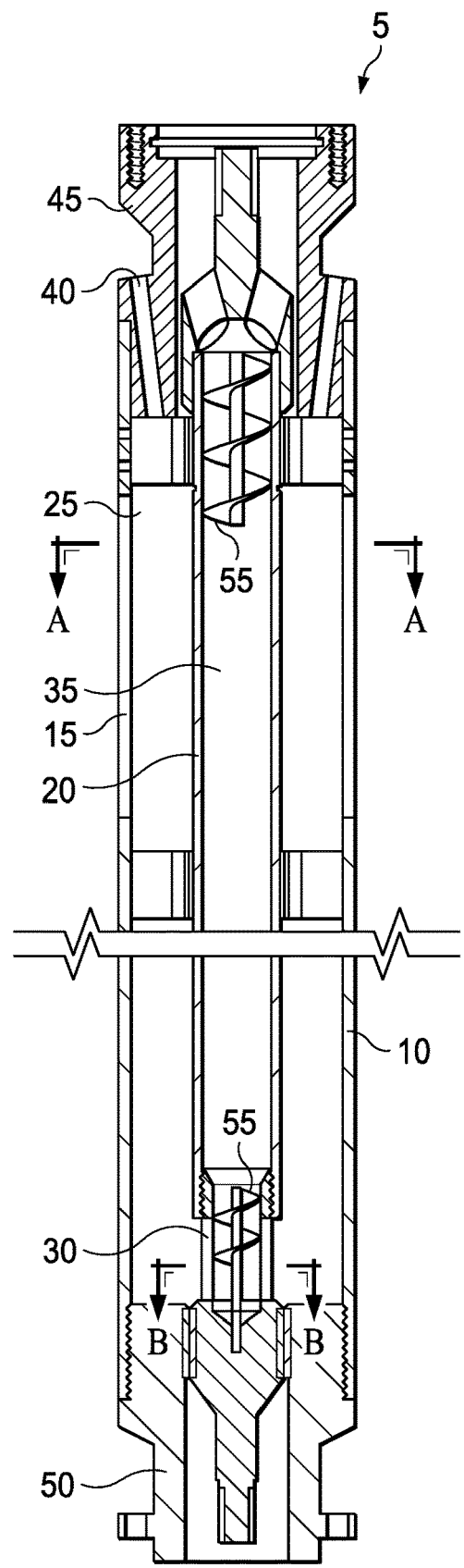
FIG. 1 is a cross-sectional illustration of an example reverse flow gas separator in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to production operations, and more particularly, to the use of a reverse flow gas separator to prevent a gas or gas slug from reaching a pump intake and to also provide a reservoir of fluid so that the pump may still operate when high concentrations of gas or a gas slug is present.

In the following detailed description of several illustrative examples, reference is made to the accompanying drawings that form a part hereof, and in which is shown by way of illustration, examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples is defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

As used herein, the term "formation" encompasses the term "reservoir," referring to a portion of the formation which has sufficient porosity and permeability to store or transmit fluids (e.g., hydrocarbons). As used herein, the term "fracturing fluid" refers generally to any fluid that may be used in a subterranean application in conjunction with a desired function and/or for a desired purpose. The term "fracturing fluid" does not imply any particular action by the fluid or any component thereof.

The examples described herein relate to the use of a reverse flow gas separator to separate gas from liquid before the gas is able to reach a pump intake and to also provide a reservoir of fluid so that the pump may still operate when high concentrations of gas or a gas slug are present. The reverse flow gas separator reverses the flow of a production fluid before it reaches the pump intake. As the flow of fluid reverses, any gas dispersed in the fluid rises due to its inherent buoyancy and the liquid portion of the fluid flows downward in the reverse flow gas separator due to gravity. Thus, the gas portion and liquid portion of the production fluid may be separated. Advantageously, the liquid portion flowing downward may be circulated into the hollow driveshaft to be flowed to the pump while the separated gas portion does not enter the hollow drive shaft and consequently does not reach the pump intake. As a further advantage, the use of a hollow driveshaft as a separate fluid channel increases the area available for fluid flow in the separation space outside the drive shaft. As the dimensions of the reverse flow gas separator are limited by the surrounding dimensions of the wellbore, the increased flow area outside of the driveshaft allows for slower fluid flow in said area. Decreased fluid flow results in additional residence time for the fluid in this separation area, and the increased residence time results in increased separation of the gas from the liquid portion of the production fluid. Additionally, the rotational influence of the driveshaft in the separation area promotes rotation of the fluid in said area. This rotation creates a centrifugal force that further increases separation of the liquid and gas portions of the fluid. Another advantage is that the intakes in the housing of the reverse flow gas separator are angled inward at a direction and grade that is not perpendicular with the housing. The angled intakes further promote rotation of the fluid as it enters the housing of the reverse flow gas separator. Additionally, the gas exit port(s) located in the upper portion of the separation area is angled towards the driveshaft to provide an exit path for the gas accumulating near the rotating driveshaft. Another advantage is that the reverse flow gas separator may be provided with a length sufficient to store a reservoir of liquid towards the base of the reverse gas flow separator. The volume of liquid stored is determined by the dimensions of the reverse flow gas separator. The stored liquid may allow the reverse flow gas separator to continue pumping should the reverse flow gas separator encounter a gas slug.

FIG. 1 illustrates a cross-sectional view of a reverse flow gas separator 5. The reverse flow gas separator 5 comprises a housing 10, a driveshaft 20, a head 45, and a base 50. The reverse flow separator 5 may be installed in a production string within a wellbore. The reverse flow gas separator 5 may separate the gas portion of a production fluid from the liquid portion of the production fluid. The gas may be separated from the production fluid prior to the production fluid reaching an upstream pump that is also disposed along the production tubing. As the flow of the production fluid is reversed, any gas dispersed in the production fluid rises due to its inherent buoyancy and the liquid portion of the production fluid flows downward in the reverse flow gas separator 5 due to gravity. The liquid portion is then flowed upward through the hollow driveshaft 20 and to an upstream pump (not illustrated). The pump creates a pressure differential downstream which assists in pulling the downstream liquid portion into the pump so that it may enter the pump and be lifted upstream of the pump.

Figure 2:
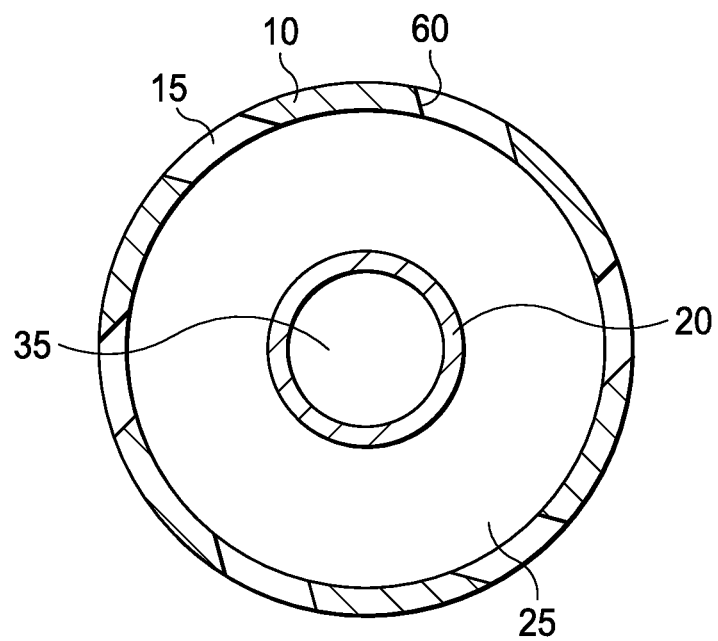
FIG. 2 is cross-sectional illustration of the housing of the example reverse flow gas separator of FIG. 1 in accordance with one or more examples described herein.

The housing 10 may comprise any sufficient material for use in a wellbore. General examples may include, but are not limited to, metal, metal alloys, and polymer-based materials. Specific examples may include, but are not limited to, steel. The housing 10 comprises at least one housing intake 15. Housing intake 15 extends in the axial direction along the housing 10 and may be placed along any portion of the housing 10 and extend any desired length. Housing intake 15 comprises at least one side that is angled inward at a direction and grade that is not perpendicular with the housing 10. The angling of the housing intake 15 is illustrated in FIG. 2 and discussed in more detail below. The angling of the housing intake 15 promotes rotation of the production fluid as it enters the housing 10. The direction of the angling is coordinated with the rotational direction of the driveshaft 20. If the driveshaft 20 is designed to rotate clockwise, then the angling of the housing intake 15 will be as illustrated in the cross-section of FIG. 2. If the driveshaft 20 is designed to rotate counter-clockwise, then the angling of the housing intake 15 will be reversed from the illustration in FIG. 2. In some examples, multiple housing intakes 15 may be deployed along the circumference of the housing 10 at regular or irregular intervals. In some examples, multiple housing intakes 15 may be deployed along the length of the housing 10 at regular or irregular intervals.

With continued reference to FIG. 1, a first void space 25 is located within the interior of the housing 10. The driveshaft 20 is disposed adjacent to and partially defines the dimensions of the first void space 25 located within the interior of the housing 10. The first void space 25 is defined by the volume of space between the interior of the housing 10 and the exterior of the driveshaft 20. The first void space 25 is the separation area for the production fluid. In the first void space 25, the gas portion of the production fluid rises to the gas exit port 40 and the liquid portion of the production fluid sinks to the bottom of the reverse flow gas separator 5 where it is pulled into the driveshaft intake 30 and flowed upstream within the hollow driveshaft 20 to the pump (not illustrated). The first void space 25 does not comprise any additional separation barriers or compartments and is a singular continuous area. As such, the separated fluid is removed from the first void space 25 by flowing into the hollow driveshaft 20 which functions as a separate fluid channel to maintain separation of the gas and fluid portions as well as provide a flow channel for the liquid portion of the production fluid to travel to the pump. Utilization of a hollow driveshaft 20 as a distinct fluid channel allows for the first void space 25 to have a larger separation area relative to a design with a solid driveshaft and divided first void space 25. The larger separation area of the first void space 25 allows for increased residence time and reduced fluid velocity. Increased residence time and reduced fluid velocity results in increased gas separation while the production fluid resides within the first void space 25.

Figure 3:
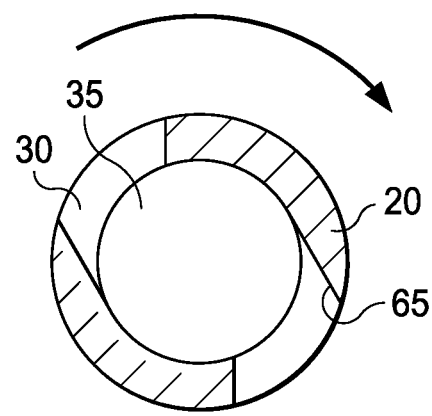
FIG. 3 is cross-sectional illustration of the driveshaft of the example reverse flow gas separator of FIG. 1 in accordance with one or more examples described herein.

The driveshaft 20 is disposed within the interior of the housing 10 and is adjacent to the first void space 25. The driveshaft 20 may comprise any sufficient material for use in a wellbore. General examples may include, but are not limited to, metal, metal alloys, and polymer-based materials. Specific examples may include, but are not limited to, steel. The driveshaft 20 comprises at least one driveshaft intake 30. Driveshaft intake 30 extends in the axial direction along the driveshaft 20 and may be placed along any portion of the driveshaft 20 and extend any desired length. Driveshaft intake 30 comprises at least one side that is angled inward at a direction and grade that is not perpendicular with the driveshaft 20. The angling of the driveshaft intake 30 is illustrated in FIG. 3 and discussed in more detail below. In some examples, multiple driveshaft intakes 30 may be deployed along the circumference of the driveshaft 20 at regular or irregular intervals. In some examples, multiple driveshaft intakes 30 may be deployed along the length of the driveshaft 20 at regular or irregular intervals.

The driveshaft 20 rotates within the first void space 25 in a clockwise or counter-clockwise direction as desired. The driveshaft 20 should rotate in the direction in which the housing intakes 15 are angled in order to promote rotation of the production fluid while within the first void space 25 and induce centrifugal flow. As the production fluid rotates with the first void space 25, the residence time of the production fluid within the first void space 25 is increased providing additional separation of the gas portion from the liquid portion of the production fluid. Further, the centrifugal force creates radial downward flow that may further aid in separation as the gas portion rises within the first void space 25 due to its buoyancy. Additionally, in some examples, the gas portion may accumulate near the driveshaft 20 as the driveshaft 20 rotates due to the centrifugal force created by rotation of the driveshaft 20.

The liquid portion of the production fluid may flow through the driveshaft intakes 30 into the second void space 35 within the interior of the hollow driveshaft 20. As the pump continues to pump fluid upstream, it creates a pressure differential that may assist in pulling the liquid portion from within the second void space 35 upstream and into the pump where it may be pumped upstream of the pump. As such, the driveshaft 20 functions as the distinct fluid path for the pump intake thus allowing the first void space 25 to provide an increased area for fluid separation.

The head 45 couples to the housing 10 and may comprise any sufficient material for use in a wellbore. General examples may include, but are not limited to, metal, metal alloys, and polymer-based materials. Specific examples may include, but are not limited to, steel. The head 45 may also couple to the pump upstream. The head 45 comprises at least one gas exit port 40. The gas exit port 40 is fluidically connected to the first void space 25 and the surrounding wellbore. As discussed above, the gas exit port 40 is angled within the head 45 such that a first opening of the gas exit port 40 is positioned proximate the drive shaft 20 and further such that a second opening of the gas exit port 40 opens to the wellbore. The angling of the gas exit port 40 towards the driveshaft 20 allows the gas that accumulates near the driveshaft 20 to exit to the wellbore through the gas exit port 40.

The base 50 couples to the housing 10 and may comprise any sufficient material for use in a wellbore. General examples may include, but are not limited to, metal, metal alloys, and polymer-based materials. Specific examples may include, but are not limited to, steel. The base 50 may further couple to a seal/motor downstream of the reverse flow gas separator 5.

Optionally, augers 55 may be disposed within the second void space 35 on the interior of the driveshaft 20. Although two augers 55 are illustrated, less than two or more than two augers 55 may be provided in some examples. Augers 55 may be used to direct and promote fluid flow within the second void space 35. Augers 55 are optional and may not be present in all examples.

FIG. 2 illustrates a cross-sectional view of the housing 10, the driveshaft 20, the first void space 25, and the second void space 35 taken along line AA as illustrated in FIG. 1. As illustrated, the individual housing intakes 15 comprise at least one side 60 that is angled inward at a direction and grade that is not perpendicular with the housing 10. The angling of the side 60 of the housing intake 15 promotes rotation of the production fluid as it enters the housing 10. The direction of the angling is coordinated with the rotational direction of the driveshaft 20. If the driveshaft 20 is designed to rotate clockwise, then the angling of the housing intake 15 will be as illustrated. If the driveshaft 20 is designed to rotate counter-clockwise, then the angling of the housing intake 15 will be reversed. Although the angling of only one side 60 is discussed, it is to be understood that multiple sides of an individual housing intake 15 may be angled at an angle that is not perpendicular with the housing 10. In the illustrated example, six housing intakes 15 are deployed along the circumference of the housing 10 at regular intervals. It is to be understood that less than or more than six housing intakes 15 may be provided along the circumference of the housing 10 in alternative examples. Further, although the housing intakes 15 are illustrated at regular intervals along the circumference of the housing 10, in other examples, the housing intakes 15 may be provided at irregular intervals. In some examples, additional housing intakes 15 may be deployed along the length of the housing 10 at regular or irregular intervals that would not be illustrated along line AA and would not be viewable in the illustration of FIG. 2. These additional housing intakes 15 may be uphole or downhole of the housing intakes 15 illustrated in FIG. 2. In some additional examples, intakes may be placed in the head 45 in addition to or as alternatives to the housing intakes 15. In these additional examples, the intakes within the head 45 would function analogously to the housing intakes 15 and would comprise the same angling function to promote rotation of the fluid as it enters the reverse flow gas separator 5.

FIG. 3 illustrates a cross-sectional view of the driveshaft 20, the driveshaft intakes 30, and the second void space 35 taken along line BB as illustrated in FIG. 1. As illustrated, driveshaft intakes 30 comprise at least one side 65 that is angled inward at a direction and grade that is not perpendicular with the driveshaft 20. The angling of the side 65 of the driveshaft intake 30 promotes acceleration of the production fluid as it enters the second void space 35 within the driveshaft 20. The direction of the angling is coordinated with the rotational direction of the driveshaft 20. If the driveshaft 20 is designed to rotate clockwise, then the angling of the driveshaft intakes 30 will be as illustrated. If the driveshaft 20 is designed to rotate counter-clockwise, then the angling of the driveshaft intakes 30 will be reversed. Although the angling of only one side 65 is discussed, it is to be understood that multiple sides of an individual driveshaft intake 30 may be angled at an angle that is not perpendicular with the driveshaft 20. In the illustrated example, two driveshaft intakes 30 are deployed along the circumference of the driveshaft 20 at regular intervals. It is to be understood that less than or more than two driveshaft intakes 30 may be provided along the circumference of the driveshaft 20 in alternative examples. Further, although the driveshaft intakes 30 are illustrated at regular intervals along the circumference of the driveshaft 20, in other examples, the driveshaft intakes 30 may be provided at irregular intervals. In some examples, additional driveshaft intakes 30 may be deployed along the length of the driveshaft 20 at regular or irregular intervals that would not be illustrated along line BB and would not be viewable in the illustration of FIG. 3. These additional driveshaft intakes 30 may be uphole or downhole of the driveshaft intakes 30 illustrated in FIG. 3.

It is to be understood that the reverse flow gas separator 5 and its components as depicted in FIGS. 1-3 are only one possible configuration of a reverse flow gas separator 5. The individual pieces of the reverse flow gas separator 5 may be rearranged as would be readily apparent to one of ordinary skill in the art. As such, it is to be recognized that the reverse flow gas separator 5 is merely exemplary in nature, and various additional configurations may be used that have not necessarily been depicted in FIGS. 1-3 in the interest of clarity. Moreover, non-limiting additional components may be present, including, but not limited to, valves, condensers, adapters, joints, gauges, sensors, compressors, pressure controllers, pressure sensors, flow rate controllers, flow rate sensors, temperature sensors, and the like. As such, it should be clearly understood that the example illustrated by FIGS. 1-3 is merely a general application of the principles of this disclosure in practice, and a wide variety of other examples are possible. Therefore, the scope of this disclosure is not limited in any manner to the details of FIGS. 1-3 as described herein.

The reverse flow gas separator 5 described herein may be used to separate a gas from a liquid in a production fluid before the gas may reach a pump upstream of the reverse flow gas separator 5.

Figure 4:
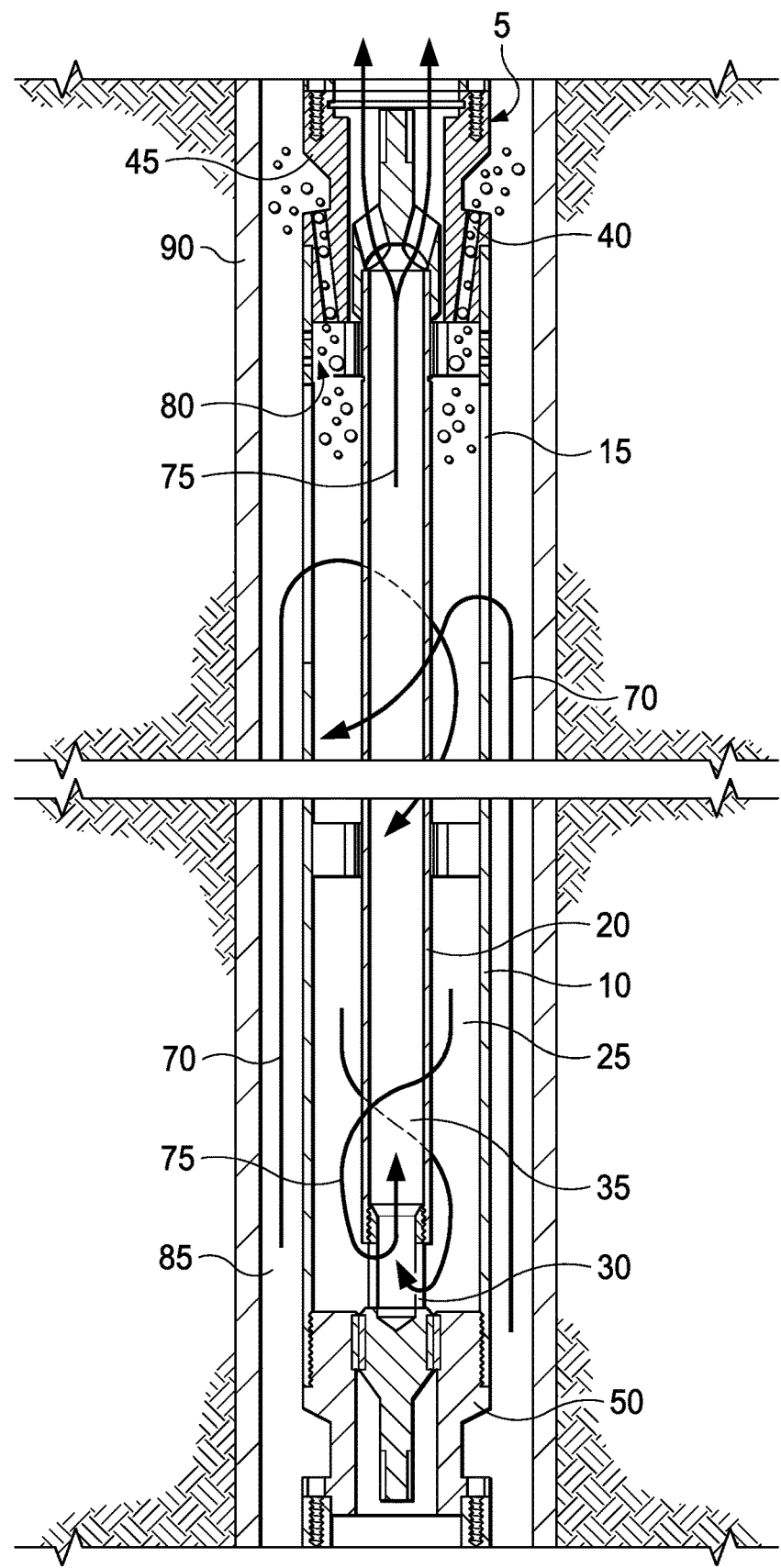
FIG. 4 is a cross-sectional illustration of an example use of a reverse flow gas separator in accordance with one or more examples described herein.

Referring now to FIG. 4, a cross-sectional view of the reverse flow gas separator 5 is illustrated as a production fluid 70 enters the reverse flow gas separator 5. The reverse flow gas separator 5 comprises a housing 10, a driveshaft 20, a head 45, and a base 50. After installation in a production string, the reverse flow gas separator 5 may be run in hole and used to separate gas from liquid in the wellbore. In the illustrated example, production fluid 70 flows uphole in the annulus 85 between the well casing 90 and the production string comprising the reverse flow gas separator 5. The production fluid 70 enters into the first void space 25 of the reverse flow gas separator 5 by flowing into the housing intake 15 of the housing 10. As discussed above, at least one side of the housing intake 15 is angled to promote rotation of the production fluid 70 as it enters the first void space 25. Within the first void space 25, the flow of the production fluid 70 is reversed as it rotates and travels downward within the first void space 25. Rotation of the production fluid 70 is induced by rotation of the driveshaft 20. The residence time within the first void space 25 is increased as there are no separating or dividing fluid channels within the first void space 25. The only upstream fluid channel is within the driveshaft 20 itself. The increased residence time and the centrifugal flow created by the rotation of the driveshaft 20 increases separation of the gas portion 80 of the liquid production fluid 70. The gas portion 80 may accumulate near the driveshaft 20 as the buoyant gas portion 80 rises within the first void space 25. Gas exit ports 40 may be angled toward the driveshaft 20 to allow for the gas portion 80 to travel out of the first void space 25 and then through the gas exit ports 40 within the head 45. Once through the gas exit ports 40, the gas portion 80 will have exited out of the reverse flow gas separator 5 where it is dispersed into the annulus 85.

The remaining liquid portion 75 of the production fluid 70 continues to travel downward in the first void zone 25. Although, the liquid portion 75 has been separated from the gas portion 80, it is to be understood that full separation may not be complete in all examples and the liquid portion 80 may still comprise a volume of gas, but at a much reduced concentration from that of the unseparated production fluid 70. Upon entering the driveshaft intakes 30, the liquid portion 75 travels through the second void space 35 within the interior of the driveshaft 20. The liquid portion 75 is then flowed upward through the hollow driveshaft 20 and to an upstream pump (not illustrated). The pump creates a pressure differential downstream which assists in pulling the downstream liquid portion 75 into the pump so that it may enter the pump and be lifted upstream of the pump. In optional examples, augers such as those illustrated in FIG. 1, may be provided within the second void space 35 of the driveshaft 20 to assist in moving the liquid portion 75 to the upstream pump.

The reverse flow gas separator 5 described herein may be used to maintain fluid separation within the pump while a gas slug passes through the reverse flow gas separator 5.

Figure 5:
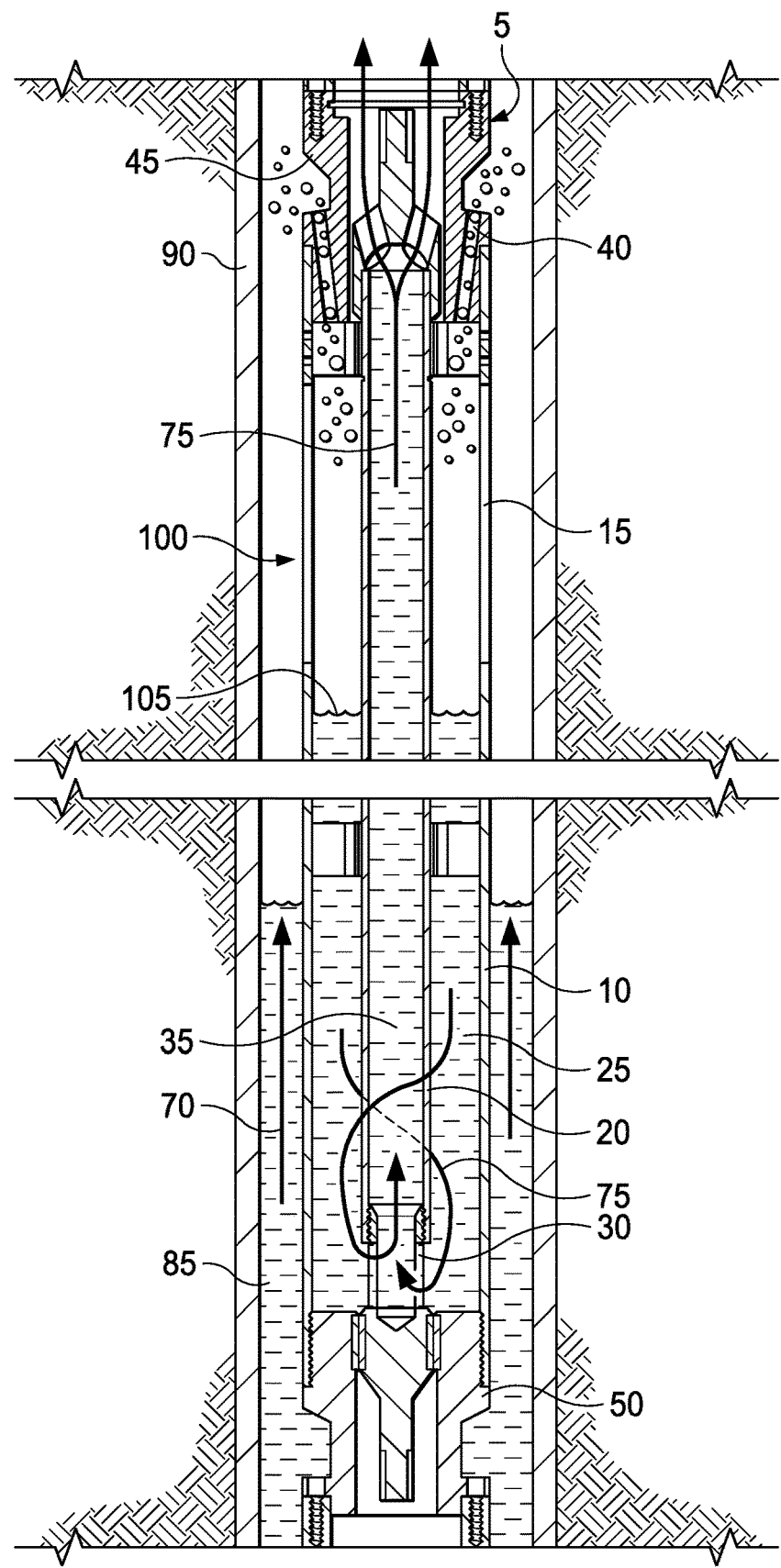
FIG. 5 is a cross-sectional illustration of another example use of a reverse flow gas separator in accordance with one or more examples described herein.

Referring now to FIG. 5, a cross-sectional view of the reverse flow gas separator 5 is illustrated as a gas slug 100 enters the reverse flow gas separator 5. The gas slug 100 is a large volume of gas that is not dispersed in a liquid. The reverse flow gas separator 5 comprises a housing 10, a driveshaft 20, a head 45, and a base 50. In the illustrated example, the gas slug 100 flows uphole in the annulus 85 between the well casing 90 and the production string comprising the reverse flow gas separator 5. The gas slug 100 enters into the first void space 25 of the reverse flow gas separator 5 by flowing into the housing intake 15 of the housing 10. Gas exit ports 40 allow for the gas slug 100 to travel out of the first void space 25 and then through the gas exit ports 40 within the head 45. Once through the gas exit ports 40, the gas slug 100 will have exited out of the reverse flow gas separator 5 where it is dispersed back into the annulus 85.

A gas-free liquid portion 75 of a production fluid 70 remains in the first void space 25 as the gas slug passes. This liquid portion 75 was previously separated out of a prior pumped production fluid 70 (as described in FIG. 4 above) which entered the reverse flow gas separator 5 prior to the gas slug 100. The liquid level 105 in the first void space 25 drops as the gas slug 100 passes, thus allowing the remaining liquid portion 75 to function as a reservoir which allows the upstream pump to continue operation. The length of the reverse flow gas separator 5 may be extended to determine the volume of the supply reservoir provided. The longer the reverse flow gas separator 5, the larger the volume of fluid that may be kept in the reservoir of the first void space 25 in order to supply the pump in case a gas slug 100 is encountered. After the gas slug 100 has passed, production fluid 70 may enter the reverse flow gas separator 5 as described in the example illustrated by FIG. 4.

It is to be recognized that the reverse flow gas separator may also directly or indirectly affect the various downhole equipment and tools that may contact the reverse flow gas separator disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the apparatus, methods, and systems generally described above and depicted in FIGS. 1-5.

Provided are methods for separating gas from liquid in a wellbore. An example method comprises allowing a fluid to enter a reverse flow gas separator comprising a housing, a first void space within the housing, a driveshaft disposed adjacent to the first void space, and a second void space disposed within the interior of the drive shaft. The method further comprises reversing the flow of the fluid inside the reverse flow gas separator; wherein the fluid comprises a liquid and a gas. The method additionally comprises flowing the gas out of the first void space and into the wellbore; and flowing the liquid into the second void space.

Additionally or alternatively, the method may include one or more of the following features individually or in combination. The reverse flow gas separator may further comprise a head coupled to the housing. The head may comprise a gas exit port that is fluidically connected to the first void space and the wellbore. The gas exit port may be angled within the head such that a first opening of the gas exit port is positioned proximate the drive shaft and further such that a second opening of the gas exit port opens to the wellbore. The driveshaft intake may comprise at least one side that is angled inward at a direction and grade that is not perpendicular with the driveshaft. The housing intake may comprise at least one side that is angled inward at a direction and grade that is not perpendicular with the housing. The driveshaft may further comprise an auger disposed within the second void space. The first void space may be defined by the interior of the housing and the exterior of the driveshaft and further wherein the first void space is continuous from the housing intake to the driveshaft intake and is not divided within its dimensions. The gas may be flowed out of the first void space through a gas exit port that is fluidically connected to the first void space and the wellbore. The gas exit port may be disposed within a head and is angled within the head such that a first opening of the gas exit port is positioned proximate the drive shaft and further such that a second opening of the gas exit port opens to the wellbore. The driveshaft may comprise a driveshaft intake comprising at least one side that is angled inward at a direction and grade that is not perpendicular with the driveshaft. The second void space may be continuous from the driveshaft intake to an opening in a terminal end of the driveshaft. The housing may comprise a housing intake comprising at least one side that is angled inward at a direction and grade that is not perpendicular with the housing. The driveshaft may further comprise an auger disposed within the second void space. The first void space may be defined by the interior of the housing and the exterior of the driveshaft and further wherein the first void space is continuous from the housing intake to the driveshaft intake and is not divided within its dimensions.

Provided is a reverse flow gas separator. An example reverse flow gas separator comprises a housing having a housing intake; wherein there is a first void space within the housing; and a driveshaft disposed adjacent to the first void space; wherein the drive shaft is hollow and comprises a second void space disposed within the interior of the drive shaft; wherein the second void space is continuous from a driveshaft intake to an opening in a terminal end of the driveshaft.

Additionally or alternatively, the reverse flow gas separator may include one or more of the following features individually or in combination. The reverse flow gas separator may further comprise a head coupled to the housing. The head may comprise a gas exit port that is fluidically connected to the first void space and the wellbore. The gas exit port may be angled within the head such that a first opening of the gas exit port is positioned proximate the drive shaft and further such that a second opening of the gas exit port opens to the wellbore. The driveshaft intake may comprise at least one side that is angled inward at a direction and grade that is not perpendicular with the driveshaft. The housing intake may comprise at least one side that is angled inward at a direction and grade that is not perpendicular with the housing. The driveshaft may further comprise an auger disposed within the second void space. The first void space may be defined by the interior of the housing and the exterior of the driveshaft and further wherein the first void space is continuous from the housing intake to the driveshaft intake and is not divided within its dimensions. The gas may be flowed out of the first void space through a gas exit port that is fluidically connected to the first void space and the wellbore. The gas exit port may be disposed within a head and is angled within the head such that a first opening of the gas exit port is positioned proximate the drive shaft and further such that a second opening of the gas exit port opens to the wellbore. The second void space may be continuous from the driveshaft intake to an opening in a terminal end of the driveshaft.

Provided are systems for separating gas from liquid in a wellbore. An example system comprises a reverse flow gas separator comprising a housing having a housing intake; wherein there is a first void space within the housing; and a driveshaft disposed adjacent to the first void space; wherein the drive shaft is hollow and comprises a second void space disposed within the interior of the drive shaft; wherein the second void space is continuous from a driveshaft intake to an opening in a terminal end of the driveshaft. The system further comprises a pump upstream of the reverse flow gas separator and fluidically connected to the second void space.

Additionally or alternatively, the system may include one or more of the following features individually or in combination. Additionally or alternatively, the reverse flow gas separator may include one or more of the following features individually or in combination. The reverse flow gas separator may further comprise a head coupled to the housing. The head may comprise a gas exit port that is fluidically connected to the first void space and the wellbore. The gas exit port may be angled within the head such that a first opening of the gas exit port is positioned proximate the drive shaft and further such that a second opening of the gas exit port opens to the wellbore. The driveshaft intake may comprise at least one side that is angled inward at a direction and grade that is not perpendicular with the driveshaft. The housing intake may comprise at least one side that is angled inward at a direction and grade that is not perpendicular with the housing. The driveshaft may further comprise an auger disposed within the second void space. The first void space may be defined by the interior of the housing and the exterior of the driveshaft and further wherein the first void space is continuous from the housing intake to the driveshaft intake and is not divided within its dimensions. The gas may be flowed out of the first void space through a gas exit port that is fluidically connected to the first void space and the wellbore. The gas exit port may be disposed within a head and is angled within the head such that a first opening of the gas exit port is positioned proximate the drive shaft and further such that a second opening of the gas exit port opens to the wellbore. The second void space may be continuous from the driveshaft intake to an opening in a terminal end of the driveshaft.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A reverse flow gas separator for separating gas from liquid in a wellbore comprising:
    a housing having a housing intake; wherein there is a first void space within the housing; and
    a driveshaft disposed adjacent to the first void space; wherein the drive shaft is hollow and comprises a second void space disposed within the interior of the drive shaft; wherein the second void space is continuous from a driveshaft intake to an opening in a terminal end of the driveshaft; wherein the driveshaft further comprises an auger disposed within the second void space; wherein the housing intake and driveshaft intake are positioned relative to each other such that a fluid entering the housing intake reverses flow relative to the flow of the fluid from outside the reverse flow gas separator in order for the fluid to enter the driveshaft intake.

2. The reverse flow gas separator of claim 1, further comprising a head coupled to the housing; wherein the head comprises a gas exit port that is fluidically connected to the first void space and the wellbore.

3. The reverse flow gas separator of claim 2, wherein the gas exit port is angled within the head such that a first opening of the gas exit port is positioned adjacent the drive shaft and further such that a second opening of the gas exit port opens to the wellbore.

4. The reverse flow gas separator of claim 1, wherein the driveshaft intake comprises at least one side that is angled inward at a direction and grade that is not perpendicular with the driveshaft.

5. The reverse flow gas separator of claim 1, wherein the housing intake comprises at least one side that is angled inward at a direction and grade that is not perpendicular with the housing.

6. The reverse flow gas separator of claim 1, wherein the first void space is defined by the interior of the housing and the exterior of the driveshaft and further wherein the first void space is continuous from the housing intake to the driveshaft intake and is not divided within its dimensions.

7. The reverse flow gas separator of claim 1, wherein the driveshaft rotates in a clockwise direction.

8. The reverse flow gas separator of claim 1, wherein the driveshaft rotates in a counter-clockwise direction.

9. A method for separating gas from liquid in a wellbore comprising:
    allowing a fluid to enter a reverse flow gas separator comprising a housing, a first void space within the housing, a driveshaft disposed adjacent to the first void space, a second void space disposed within the interior of the drive shaft; and wherein the driveshaft further comprises an auger disposed within the second void space;
    reversing the flow of the fluid inside the reverse flow gas separator; wherein the fluid comprises a liquid and a gas; wherein the housing comprises a housing intake and wherein the driveshaft comprises a driveshaft intake; wherein the housing intake and driveshaft intake are positioned relative to each other such that when the fluid enters the housing intake it reverses flow relative to the flow of the fluid from outside the reverse flow gas separator in order for the fluid to enter the driveshaft intake;

flowing the gas out of the first void space and into the wellbore; and flowing the liquid into the second void space.

10. The method of claim 9, wherein the gas is flowed out of the first void space through a gas exit port that is fluidically connected to the first void space and the wellbore.

11. The method of claim 10, wherein the gas exit port is disposed within a head and is angled within the head such that a first opening of the gas exit port is positioned adjacent the drive shaft and further such that a second opening of the gas exit port opens to the wellbore.

12. The method of claim 9, wherein the driveshaft comprises a driveshaft intake comprising at least one side that is angled inward at a direction and grade that is not perpendicular with the driveshaft.

13. The method of claim 12, wherein the second void space is continuous from the driveshaft intake to an opening in a terminal end of the driveshaft.

14. The method of claim 9, wherein the housing comprises a housing intake comprising at least one side that is angled inward at a direction and grade that is not perpendicular with the housing.

15. The method of claim 9, wherein the first void space is defined by the interior of the housing and the exterior of the driveshaft and further wherein the first void space is continuous from the housing intake to the driveshaft intake and is not divided within its dimensions.

16. A system for separating a liquid from a gas, the system comprising:

a reverse flow gas separator comprising:

a housing having a housing intake; wherein there is a first void space within the housing; and a driveshaft disposed adjacent to the first void space; wherein the drive shaft is hollow and comprises a second void space disposed within the interior of the drive shaft; wherein the second void space is continuous from a driveshaft intake to an opening in a terminal end of the driveshaft; wherein the driveshaft further comprises an auger disposed within the second void space; wherein the housing intake and driveshaft intake are positioned relative to each other such that a fluid entering the housing intake reverses flow relative to the flow of the fluid from outside the reverse flow gas separator in order for the fluid to enter the driveshaft intake; and a pump upstream of the reverse flow gas separator and fluidically connected to the second void space.

17. The system of claim 16, wherein the reverse flow gas separator further comprises a head coupled to the housing; wherein the head comprises a gas exit port that is fluidically connected to the first void space and the wellbore.

18. The system of claim 17, wherein the gas exit port is angled within the head such that a first opening of the gas exit port is positioned adjacent the drive shaft and further such that a second opening of the gas exit port opens to the wellbore.

19. The system of claim 16, wherein the driveshaft intake comprises at least one side that is angled inward at a direction and grade that is not perpendicular with the driveshaft.

20. The system of claim 16, wherein the housing intake comprises at least one side that is angled inward at a direction and grade that is not perpendicular with the housing.

* * * * *